(12) United States Patent
Yuan et al.

(10) Patent No.: US 11,909,206 B2
(45) Date of Patent: Feb. 20, 2024

(54) HYDRAULIC SYSTEMS AND COMPONENTS INCLUDING WIRELESS CONTROL TECHNOLOGY

(71) Applicant: DANFOSS A/S, Nordborg (DK)

(72) Inventors: QingHui Yuan, Edina, MN (US); Jeffrey Lowinger, Cleveland, OH (US)

(73) Assignee: DANFOSS A/S, Nordborg (DK)

( * ) Notice: Subject to any disclaimer, the term of this patent is extended or adjusted under 35 U.S.C. 154(b) by 1414 days.

(21) Appl. No.: 16/324,444

(22) PCT Filed: Aug. 9, 2017

(86) PCT No.: PCT/US2017/046065
§ 371 (c)(1),
(2) Date: Feb. 8, 2019

(87) PCT Pub. No.: WO2018/031635
PCT Pub. Date: Feb. 15, 2018

(65) Prior Publication Data
US 2019/0170170 A1    Jun. 6, 2019

Related U.S. Application Data

(60) Provisional application No. 62/372,597, filed on Aug. 9, 2016, provisional application No. 62/372,665, filed
(Continued)

(51) Int. Cl.
*H02J 15/00* (2006.01)
*H02J 13/00* (2006.01)
(Continued)

(52) U.S. Cl.
CPC .......... *H02J 15/003* (2013.01); *F16K 31/046* (2013.01); *H02J 13/00* (2013.01);
(Continued)

(58) Field of Classification Search
CPC ........ H02J 15/003; H02J 13/00; H02J 50/001; F16K 31/046; H02K 7/1823;
(Continued)

(56) References Cited

U.S. PATENT DOCUMENTS

2006/0042240 A1* 3/2006 Sporer ................. E02F 9/2221
60/329
2008/0278028 A1* 11/2008 Donelan ................ F03G 5/061
310/300
(Continued)

FOREIGN PATENT DOCUMENTS

JP    H11-287818 A    10/1999
JP    2008-099373 A    4/2008
(Continued)

OTHER PUBLICATIONS

International Search Report and Written Opinion of the International Searching Authority for International Patent Application No. PCT/US2017/046065 dated Nov. 22, 2017, 11 pages.

*Primary Examiner* — Charles Cai
(74) *Attorney, Agent, or Firm* — Merchant & Gould P.C.

(57) ABSTRACT

In one aspect, a wireless transceiver is used to wirelessly connect various electrohydraulic components in a hydraulic system. In another aspect, a self-powered wireless hydraulic system includes a harvesting device for converting hydraulic energy into electrical energy. The electrical energy generated by the harvesting device can be used to power one or more electrohydraulic components and wireless transceivers. In another aspect, a self-powered wireless hydraulic system also includes a flow control device powered by the harvesting device for actively controlling the hydraulic flow through the harvesting device.

12 Claims, 13 Drawing Sheets

Related U.S. Application Data on Aug. 9, 2016, provisional application No. 62/372,645, filed on Aug. 9, 2016.

(51) Int. Cl.
  *H02K 7/18* (2006.01)
  *F16K 31/04* (2006.01)
  *H04B 5/02* (2006.01)
  *H04W 52/02* (2009.01)

(52) U.S. Cl.
  CPC ...... *H02K 7/1823* (2013.01); *H04W 52/0267* (2013.01); *G05B 2219/41318* (2013.01); *H04B 5/02* (2013.01)

(58) Field of Classification Search
  CPC ..... H04W 52/0267; G05B 2219/41318; H04B 5/02; Y02E 60/00; F15B 21/14; F15B 2211/7058; Y04S 40/121
  See application file for complete search history.

(56) References Cited

U.S. PATENT DOCUMENTS

| | | | | |
|---|---|---|---|---|
| 2010/0109331 | A1* | 5/2010 | Hedtke | .......... G01F 1/3266 |
| | | | | 73/53.01 |
| 2011/0066297 | A1* | 3/2011 | Saberi | .......... H04Q 9/00 |
| | | | | 700/287 |
| 2017/0219195 | A1* | 8/2017 | Bordin | .......... F21V 23/006 |

FOREIGN PATENT DOCUMENTS

| | | | |
|---|---|---|---|
| JP | 4274743 B2 * | 6/2009 | |
| JP | 2016-063332 A | 4/2016 | |

\* cited by examiner

HYDRAULIC SYSTEMS AND COMPONENTS INCLUDING WIRELESS CONTROL TECHNOLOGY

CROSS-REFERENCE TO RELATED APPLICATIONS

This application is a National Stage Application of PCT/US2017/046065, filed on Aug. 9, 2017, which claims the benefit of U.S. Patent Application No. 62/372,597 filed on Aug. 9, 2016, and claims the benefit of U.S. Patent Application No. 62/372,665 filed on Aug. 9, 2016, and claims the benefit of U.S. Patent Application No. 62/372,645 filed on Aug. 9, 2016, the disclosures of which are incorporated herein by reference in their entireties. To the extent appropriate, a claim of priority is made to each of the above disclosed applications.

TECHNICAL FIELD

The present disclosure relates generally to hydraulic systems and components. More particularly, the present disclosure relates to wireless control technology for electrohydraulic systems and components.

BACKGROUND

Hydraulic systems traditionally include electrohydraulic components that are electronically controlled. The electrohydraulic components are traditionally connected to corresponding control electronics through wired connections. Wired connections are also made to various hydraulic sensors incorporated within the system. Recently, there has been increased use of distributed sensing and control modules. As the number of sensors and control modules increases, the installation and maintenance burden will increase.

Wireless communication can effectively support bi-directional signal communication. However, wireless hydraulic systems still require power. In certain examples, the power for supporting a wireless hydraulic system may be derived from a battery or from a power line. Ultra low power modules can extend battery life, but the use of batteries to power a large number of nodes in a wireless hydraulic system can be cost prohibitive. Furthermore, for control modules where power is needed for controlling additional structures such as solenoids, the current and power requirements may extend beyond those available by batteries. In case of using a power line such as a traditional power cord, the hydraulic system would not be 100% wireless.

SUMMARY

The present disclosure relates generally to the use of wireless technology to lower installation, commission, and maintenance costs associated with increased intelligence within hydraulic systems. In one possible configuration and by non-limiting example, wireless technologies are used to provide communication between various active electrohydraulic components, sensors, and controllers of a hydraulic system.

In one aspect, the disclosed technology relates to a hydraulic system including a harvesting device for converting hydraulic energy into electrical energy, an electrohydraulic component powered by the electrical energy from the harvesting device, and a wireless transceiver powered by the electrical energy from the harvesting device. In one example, the harvesting device includes a hydraulic motor that drives an electric generator. In another example, the harvesting device includes a turbine that drives an electric generator. In one example, the electric generator is a 3-phase brush-less direct current generator.

In another aspect, the disclosed technology relates to a hydraulic system including a harvesting device for converting hydraulic energy into electrical energy, a flow control device powered by the harvesting device for actively controlling the hydraulic flow through the harvesting device, an electrohydraulic component powered by the electrical energy from the harvesting device, and a wireless transceiver powered by the electrical energy from the harvesting device. In one example, the harvesting device includes a hydraulic motor that drives an electric generator. In another example, the harvesting device includes a turbine that drives an electric generator. In one example, the electric generator is a 3-phase brush-less direct current generator. In another example, the flow control device includes a solenoid controlled variable sized orifice. In one example, the hydraulic system also includes a controller that varies a size of the variable sized orifice based on the electrical load require to be met by the harvesting device so that the harvesting device self-compensates to reduce voltage level fluctuations caused by variations in electrical loads.

In another aspect, the disclosed technology relates to an electrohydraulic assembly including an electrohydraulic component having electronic control circuitry, and a wireless transceiver that interfaces with the electronic control circuitry, wherein the wireless transceiver is configured to receive control commands for the electrohydraulic component, and the wireless transceiver is configured to transmit operational information corresponding to the electrohydraulic component. In one example, the electrohydraulic component includes a valve, motor, actuator, or pump.

In another aspect, the disclosed technology relates to a wireless device including a wireless transceiver module configured to interface with a standard wired electrohydraulic component to convert and retrofit the standard wired electrohydraulic component into a wirelessly controlled electrohydraulic component. In one example, the wireless transceiver module includes a plug that interfaces with the standard electrohydraulic component.

In another aspect, an electrohydraulic package includes at least one electrohydraulic component, at least one sensor, and a wireless transceiver device that interfaces with the electrohydraulic component and the sensor.

In another aspect, the disclosed technology relates to a hydraulic component including a hydraulic sensor, and a wireless device that interfaces with the hydraulic sensor.

In another aspect, the disclosed technology an electrohydraulic system including an electrohydraulic component having electronic control circuitry and a first wireless transceiver that interfaces with the electronic control circuitry, the first wireless transceiver is configured to wirelessly receive control commands for the electrohydraulic component, and to wirelessly transmit operational information corresponding to the electrohydraulic component, and a human machine interface including a second wireless transceiver configured to wirelessly transmit the control commands from the human machine interface to the electrohydraulic component, and to wirelessly receive the operation information from the first wireless transceiver.

A variety of additional inventive aspects will be set forth in the description that follows. The inventive aspects can relate to individual features and to combinations of features. It is to be understood that the foregoing general description and the following detailed description are exemplary and explanatory only and are not restrictive of the broad inventive concepts upon which the examples disclosed herein are based.

DETAILED DESCRIPTION

Aspects of the present disclosure, relate to wireless hydraulic systems. In certain examples, wireless transceivers and electrohydraulic components within such systems can be powered without the use of batteries or a power cord.

Figure 1:
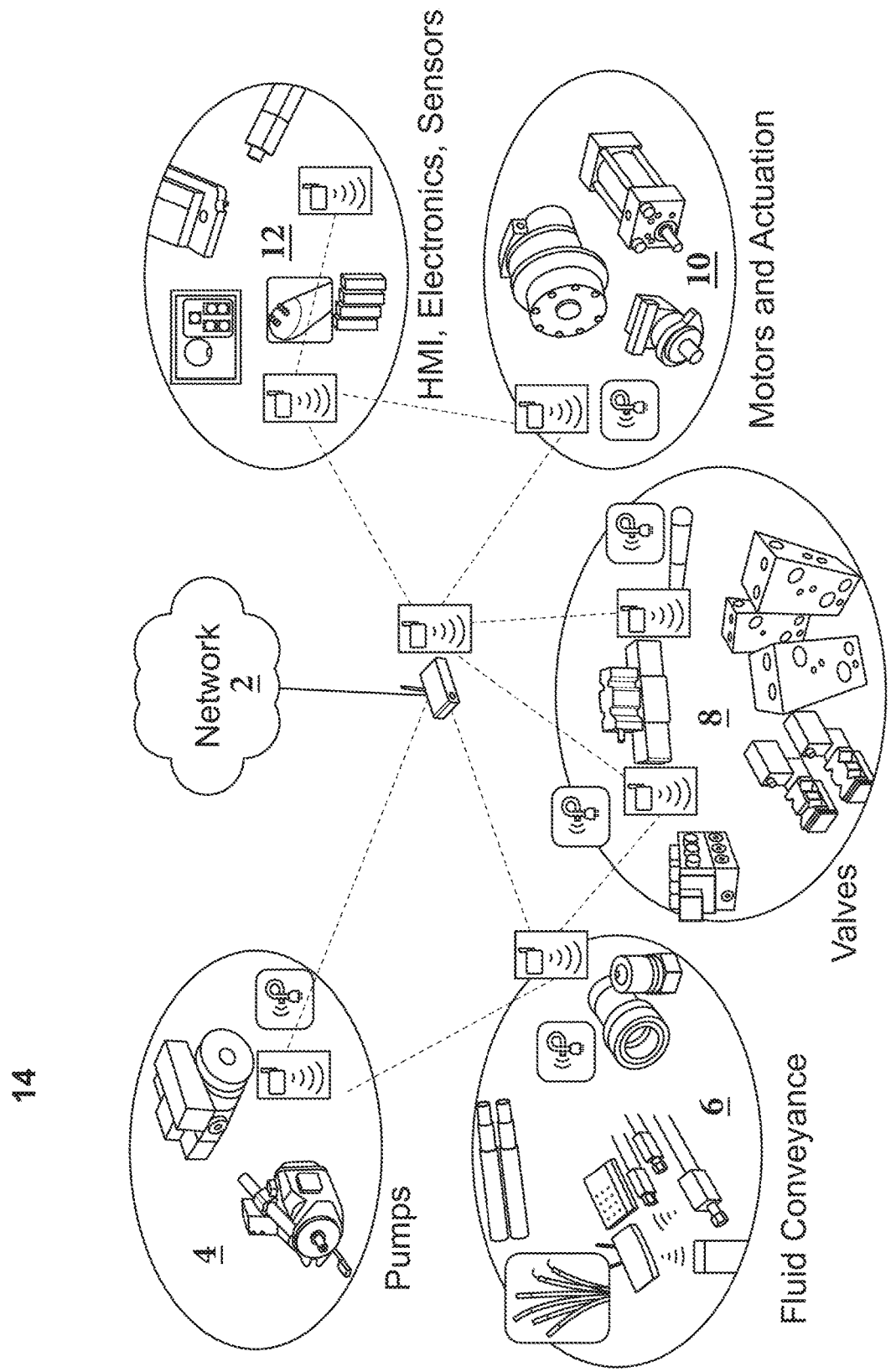
FIG. 1 shows an example wireless electrohydraulic system in accordance with the principles of the present disclosure.

FIG. 1 shows a first aspect of the present disclosure which relates to a wireless network 2 that can be used to wirelessly connect various components of a hydraulic system 14. The various components of the hydraulic system 14 can include pumps 4, fluid conveyance devices 6 (e.g., couplers, etc.), valves 8 such as industrial valves (e.g., proportional valves, solenoid driven valves, etc.), motors and actuators 10 (e.g., hydraulic cylinders), and human machine interfaces (e.g., touchscreens, computers, displays, controllers, joysticks or other structures), electronics, and sensors 12. It will be appreciated that the wireless network 2 can be arranged in a star topology in which the various components interface with a central control location. It will be appreciated that the wireless network 2 can also be arranged in a mesh topology where the various electrohydraulic components communicate directly with one another.

Figure 2:
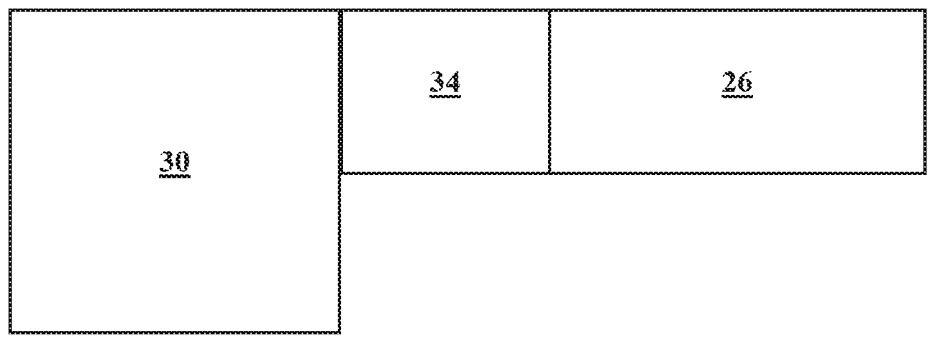
FIG. 2 shows a wireless transceiver device such as a wireless plug coupled to an electrohydraulic component.

FIG. 2 illustrates an electrohydraulic assembly in accordance with the principles of the present disclosure. The electrohydraulic assembly can include an electrohydraulic component 26 that includes electronic control circuitry. The electrohydraulic assembly can also include a wireless transceiver 30 configured to receive wireless control commands for controlling operation of the electrohydraulic component 26. The wireless transceiver 30 also can be configured to wirelessly transmit operational information corresponding to the hydraulic component 26. In certain examples, the hydraulic component 26 can be a valve (e.g., a proportional valve, solenoid valve, etc.), a motor, an actuator or a pump. In certain examples, the wireless transceiver 30 can include a wireless plug 34 that plugs into the electrohydraulic component 26. In certain examples, the wireless plug 34 is an M8 industrial connector. In certain examples, the electrohydraulic component 26 is a standard wired electrohydraulic component and the wireless transceiver 30 is configured to convert or retrofit the standard wired electrohydraulic component 26 such that the standard wired electrohydraulic component 26 can send and receive information (e.g., control commands, diagnostic information, operational information, positional information, pressure information, temperature information, etc.) wirelessly.

Figure 3:
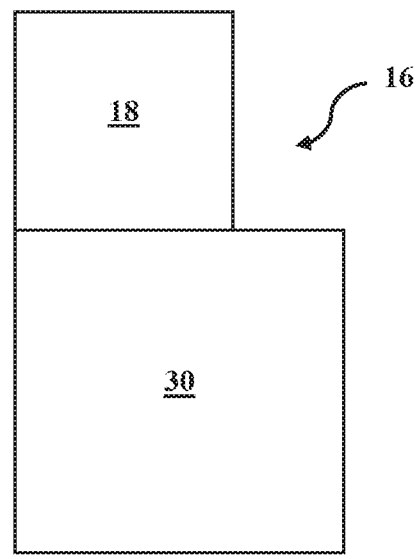
FIG. 3 shows a wireless transceiver device such as a wireless plug coupled to a local electrohydraulic sensor.

FIG. 3 shows a hydraulic component 16 including a local hydraulic sensor 18 and a wireless transceiver 30 that interfaces with the hydraulic sensor 18. In certain examples, the wireless transceiver 30 can be a wireless plug that converts the local hydraulic sensor 18 from a wired sensor to a wireless sensor.

Figure 4:
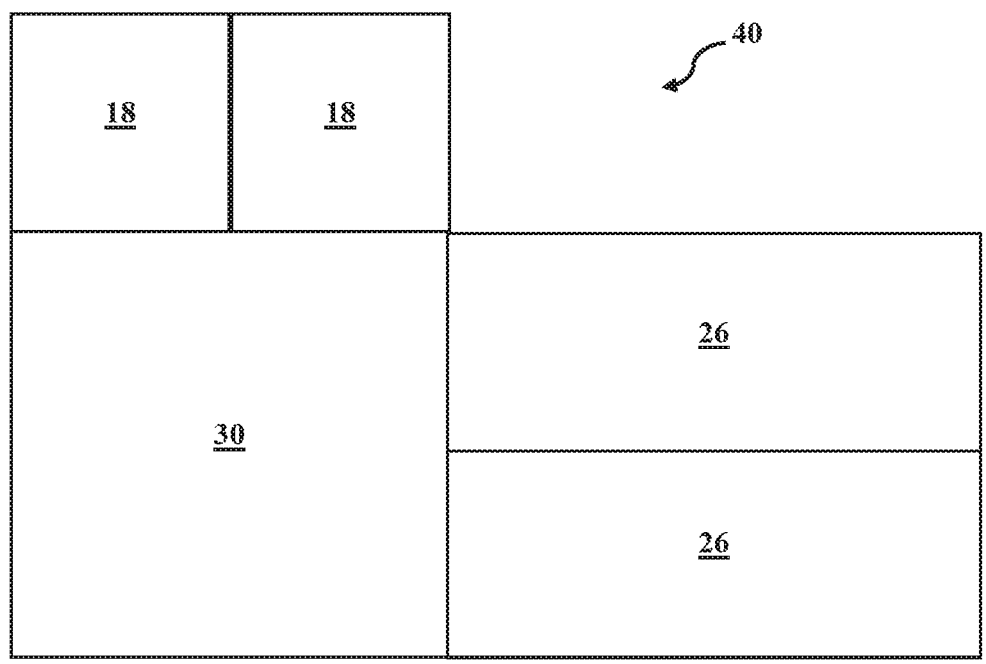
FIG. 4 shows an electrohydraulic package arrangement including a plurality of electrohydraulic components and a plurality of local sensors that all interface with a common wireless transceiver.

FIG. 4 illustrates a hydraulic package 40 having a plurality of components that are co-located at one location. In certain examples, the hydraulic package 40 includes a plurality of local hydraulic sensors 18 (e.g., pressures sensors, temperature sensors, position sensors, speed sensors, flow sensors, etc.) that interface with a wireless transceiver device 30. The hydraulic package 40 also includes a plurality of active hydraulic components 26 (e.g., hydraulic pumps, hydraulic motors, hydraulic valves, hydraulic actuators, etc.) that also interface with the wireless transceiver 30. The wireless transceiver 30 interfaces with all the electrohydraulic components such that all the electronic components can be wirelessly controlled by a remote wireless control unit. The wireless transceiver 30 can also allow the electrohydraulic package to interface directly or indirectly with other electrohydraulic components or electrohydraulic packages that are integrated as part of the wireless network.

Figure 5:
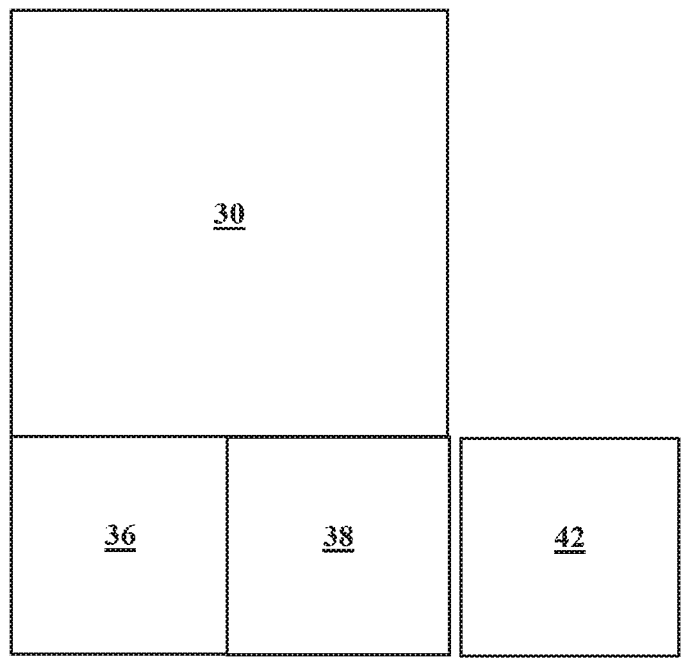
FIG. 5 shows a wireless transceiver device interfacing with an electrohydraulic control device such as an electrohydraulic controller, a human machine interface, a touchscreen, a computer, an active display or other device suitable for controlling and interfacing with one or more electrohydraulic components.

FIG. 5 shows a wireless transceiver 30 such as a wireless plug interfacing with a standard wired controller 36 which may include a human machine interface 38 such as a touchscreen, programmable display, computer, joystick or other structures. As such, the controller 36 is converted from a standard wired controller to a wireless controller.

Figure 6:
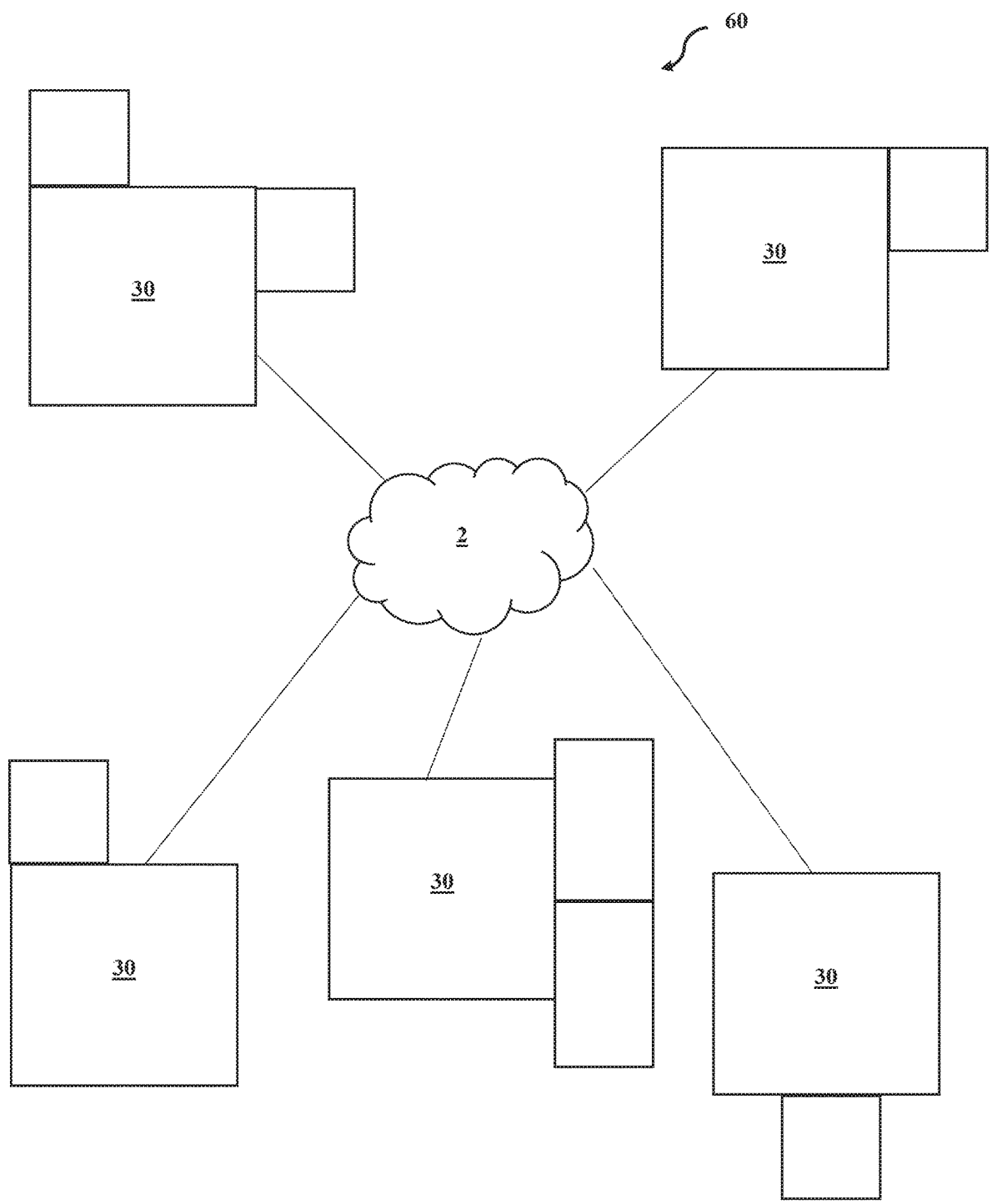
FIG. 6 shows an electrohydraulic system in which a plurality of wireless transceivers have been coupled to corresponding sensors and active electrohydraulic components to create an interconnected wireless network.

FIG. 6 shows a hydraulic system 60 including the wireless network 2 for interconnecting various components of the hydraulic system 60 wirelessly. In certain examples, the various components of the hydraulic system 60 can include sensors and active components. The wireless transceivers 30 can be assigned to a single sensor or component (e.g., a local sensor 18 or an active electrohydraulic component 26) or one wireless transceiver 30 can be assigned to a plurality of different sensors and components that are generally co-located with respect to one another.

Figure 7:
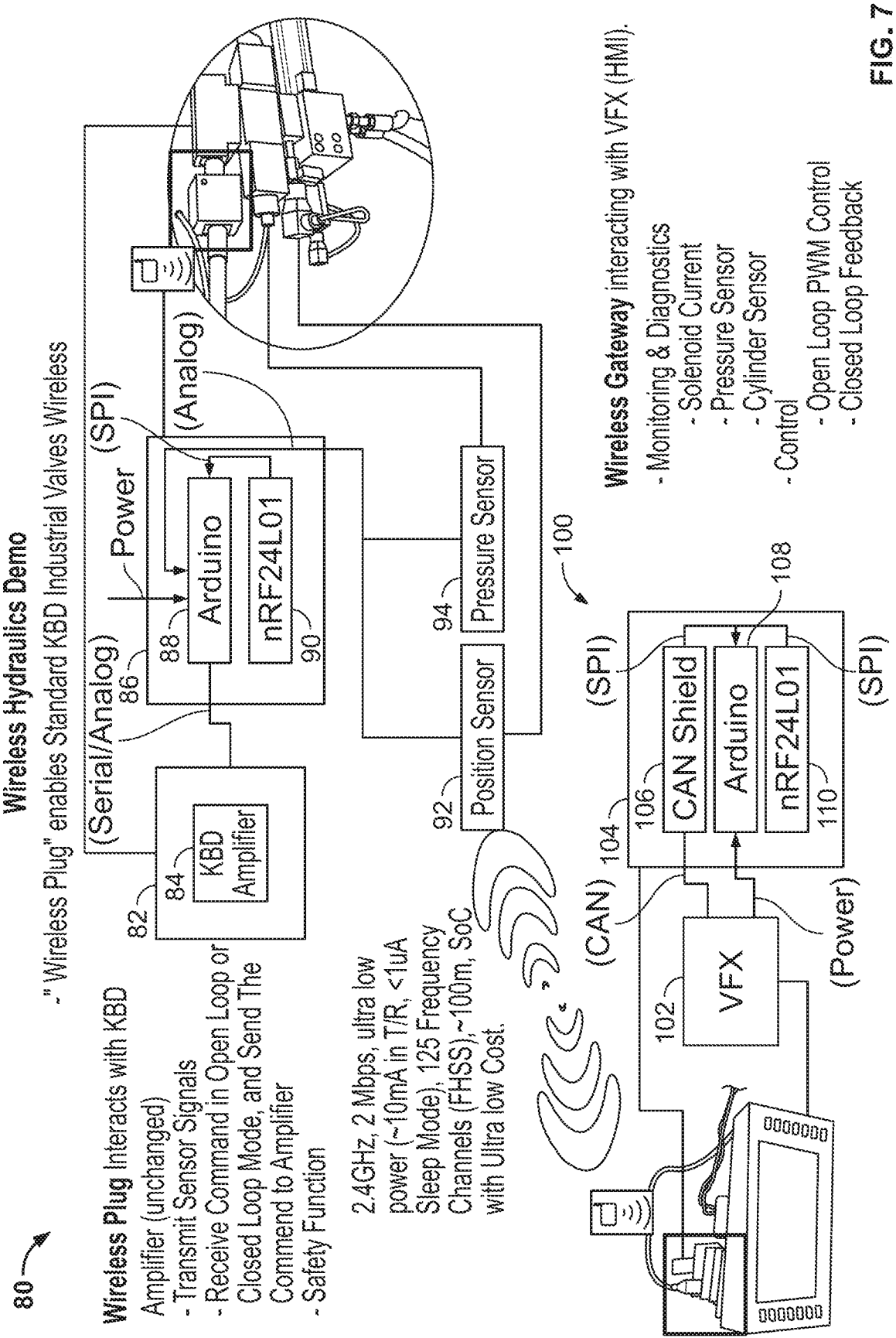
FIG. 7 shows an example wireless electrohydraulic system including an electrohydraulic package having an industrial valve and a plurality of sensors that interfaces wirelessly with a human machine interface (HMI).

FIG. 7 shows an example wireless hydraulic system 80. The hydraulic system 80 includes an electrohydraulic component such as an industrial valve 82 having electronic control circuitry 84. The system also includes a transceiver device 86 having a microprocessor 88 that interfaces with the control circuitry 84. The microprocessor 88 also interfaces with a wireless transceiver unit 90 that may include an antenna. The microprocessor 88 also interfaces with a plurality of sensors such as a position sensor 92 and a pressure sensor 94. The wireless hydraulic system 80 further includes a wireless gateway 100 including a human machine interface 102 such as a programmable display, joystick, computer, touchscreen, etc. The wireless gateway 100 also includes a wireless device 104 including a CAN shield 106 that interfaces with the human machine interface 102. The wireless device 104 also includes a microprocessor 108 that interfaces with the CAN shield 106 and also interfaces with a wireless transceiver unit 110 (e.g., a radio frequency module). The wireless gateway 100 can control the wireless hydraulic system 80 wirelessly using open loop pulse width modulation (pwm) with modulation control protocol or closed looped feedback. The wireless gateway 100 can also provide wireless monitoring and diagnostics with respect to the wireless hydraulic system 80. The monitoring can include solenoid current corresponding to a solenoid used to drive movement of the industrial valve 82, pressure sensor information, valve position information, cylinder sensor information, etc.

Figure 8:
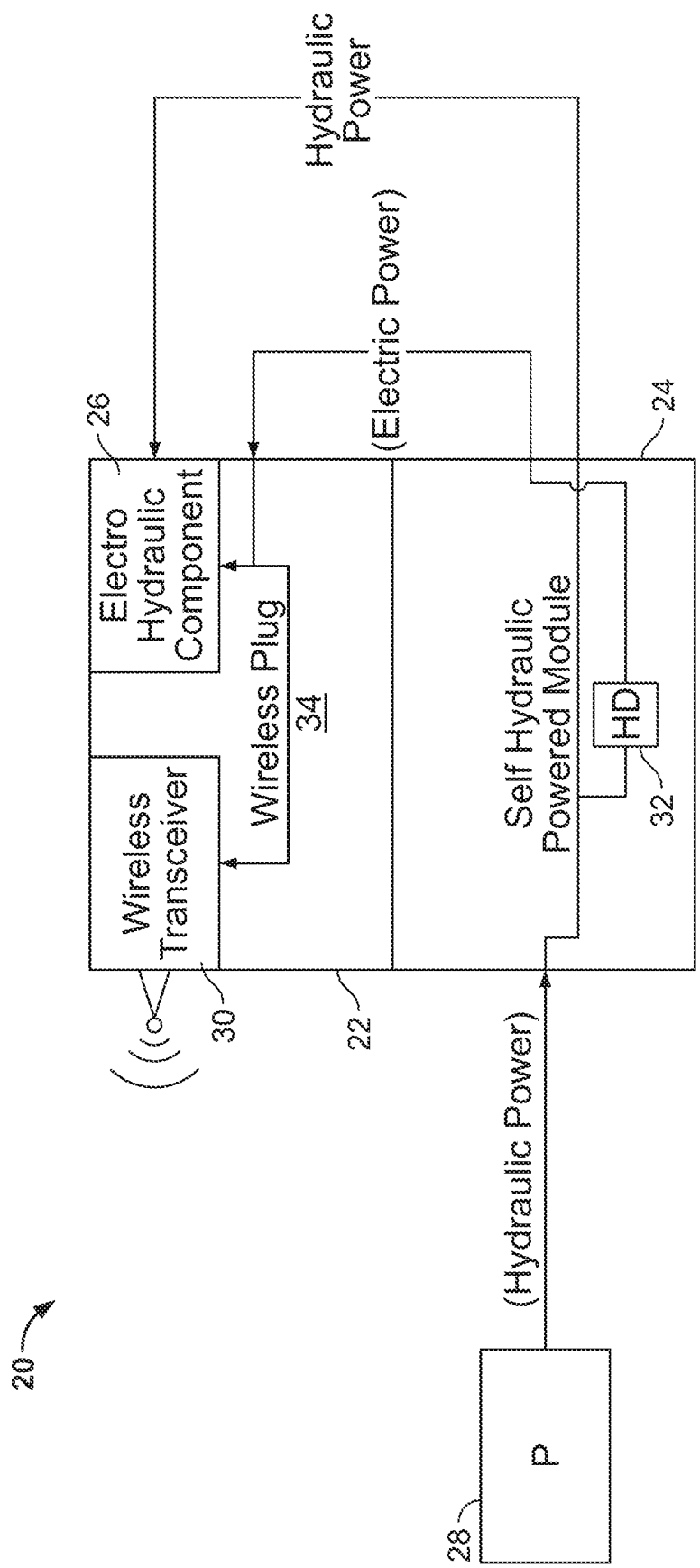
FIG. 8 illustrates a wireless electrohydraulic system in accordance with the principles of the present disclosure that can harvest hydraulic power and convert the harvested hydraulic power into electrical power for powering electrical components such as a wireless transceiver, sensors, actuators, and controllers.

FIG. 8 shows a second aspect of the present disclosure which relates to a self-powered wireless hydraulic system 20 in accordance with the principles of the present disclosure. In certain examples, the system 20 can support wireless sensing and control devices within the system such as sensing and control devices for a hydraulic valve, a hydraulic cylinder, a hydraulic pump, a hydraulic motor, a hydraulic sensor, etc. The system 20 can be self-powered to the extent that the system 20 can convert hydraulic power to electrical power for powering the system 20. Thus, the system 20 does not require a battery and does not require external power to be supplied by a wire such as a power cord.

Referring still to FIG. 8, the self-powered wireless hydraulic system 20 includes a wireless module 22 and a self-powering module 24. The wireless module 22 can interface an electrohydraulic component 26 with a wireless transceiver 30 as discussed above with regard to FIGS. 1-7. The wireless transceiver 30 can communicate with a remote control unit or with other electrohydraulic components. Thus, the wireless transceiver 30 allows the electrohydraulic component 26 to be wirelessly controlled by a remote control station or other device. The wireless transceiver 30 also allows feedback data, sensed data, or other data to be transmitted wirelessly from the electrohydraulic component 26 to remote locations for diagnosis, control, or other purposes.

The electrohydraulic component 26 receives hydraulic fluid that is pressurized from a hydraulic power source such as a hydraulic pump 28. The pressurized hydraulic fluid from the pump 28 passes through the self-powering module 24 before being conveyed to the electrohydraulic component 26. At the self-powering module 24, hydraulic energy from the pressurized hydraulic fluid can be harvested and converted to electrical power by a harvesting device 32. The electrical power can then be used to power the wireless transceiver 30 and the electrohydraulic component 26 as well as other devices connected to the electrohydraulic component 26. For example, the electrohydraulic component 26 can include a solenoid driven valve. The electrical power can be used to power the solenoid and can also be used to power active control circuitry within the electrohydraulic component 26. The electrical power can also be used to power various sensors (e.g., pressure sensors, temperature sensors, speed sensors, position sensors or other sensors) provided at the wireless module 22 and that are interfaced with the electrohydraulic component 26.

Figure 9:
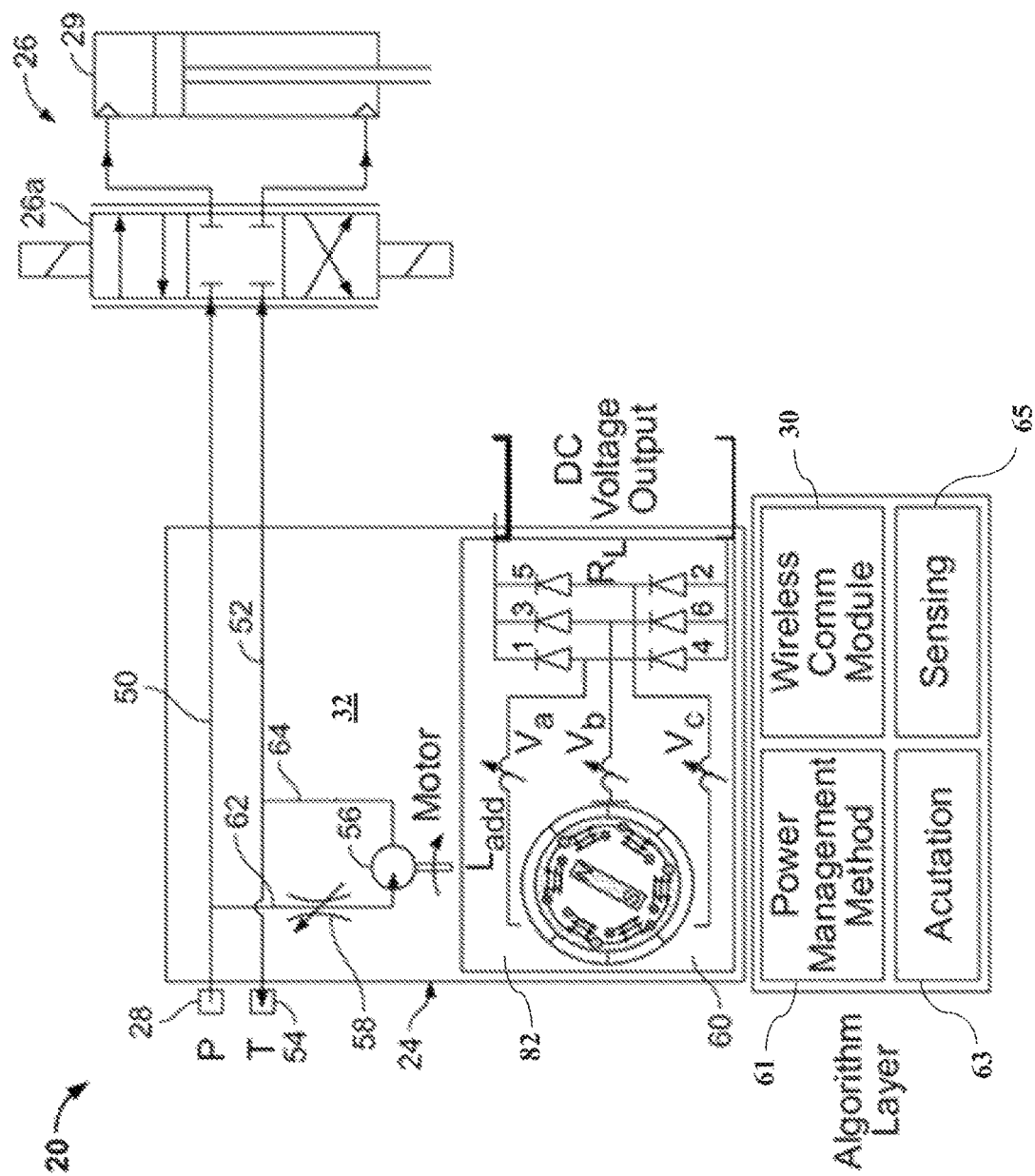
FIG. 9 shows a first example of a self-powered wireless hydraulic system in accordance with the principles of the present disclosure that uses a motor and a generator to harvest hydraulic energy for conversion into electrical power for powering various electronic components.

FIG. 9 is a more detailed view of the self-powered wireless hydraulic system 20. As shown at FIG. 9, the self-powering module 24 includes a pump line 50 (e.g., a high pressure line) and a tank line 52 (e.g., a low pressure line). The pump line 50 connects to the pump 28 and also connects to a pressure point of the electrohydraulic component 26 which is depicted as a solenoid driven 3-position proportional valve 26a which controls movement of a hydraulic cylinder 29. The tank line 52 connects to tank 54 and also connects to a return part of the valve 26a. The harvesting device 32 is shown including a hydraulic motor 56, a reducing valve 58, and an electric generator 60. The electric generator 60 can be configured to generate a dc voltage output. In one example, the electric generator 60 can include a brushless 3-phase dc generator. As depicted at FIG. 9, line 62 connects the upstream side of the motor 56 to the high pressure line 50 and line 64 connects the downstream side of the motor 56 to the tank line 52. The reducing valve 58 is provided along the line 62. The motor 56 is configured to drive the generator 60. Energy is harvested by tapping a small amount of the pressurized hydraulic fluid from the high pressure line 50 and diverting the small amount of pressurized hydraulic fluid through the reducing valve 58 to the motor 56 such that the motor 56 is turned to drive the generator 60. The hydraulic fluid is then returned through the line 64 to the tank 54. The hydraulic motor 56 rotates the generator 60. The generator 60 can include a rectifier and can provide dc voltage as an output. The dc voltage can be further regulated to meet constant voltage requirements for one or more electronic power inputs.

The electrical power generated by the generator 60 can be used to power various sensors, actuators, and communication and control devices in the wireless hydraulic system 20 including the self-powering module 24 itself. For example, the dc voltage output from the generator 60 can be directed to a power management module 61 that selectively directs electrical power as needed to the wireless transceiver 30, to actuators 63 such as the solenoid of the valve 26a for actuation of the valve 26a, and to sensors 65 for sensing various parameters of the hydraulic system. Thus, the generator 60 converts hydraulic energy into electrical energy for powering the wireless hydraulic system 20 including the electrohydraulic component 26, the wireless transceiver 30, and the self-powering module 24. In this way, the need for cables or wires for supplying supplemental power to the wireless hydraulic system 20 is eliminated.

In certain examples, the harvesting device 32 is positioned in parallel with other hydraulic components such as the electrohydraulic component 26. The electronics used in the wireless hydraulic system 20 generally require small amounts of power thus only a small amount of motor displacement is needed and the motor 56 can be relatively small in size. Additionally, only small flow rates are needed to power the electric motor 56. In certain examples, the harvesting device 32 operates as a high pressured low flow device. Disturbance of electrical loading can be addressed by voltage regulation, and disturbances related to hydraulic fluctuation can be handled by the reducing valve 58.

Figure 10:
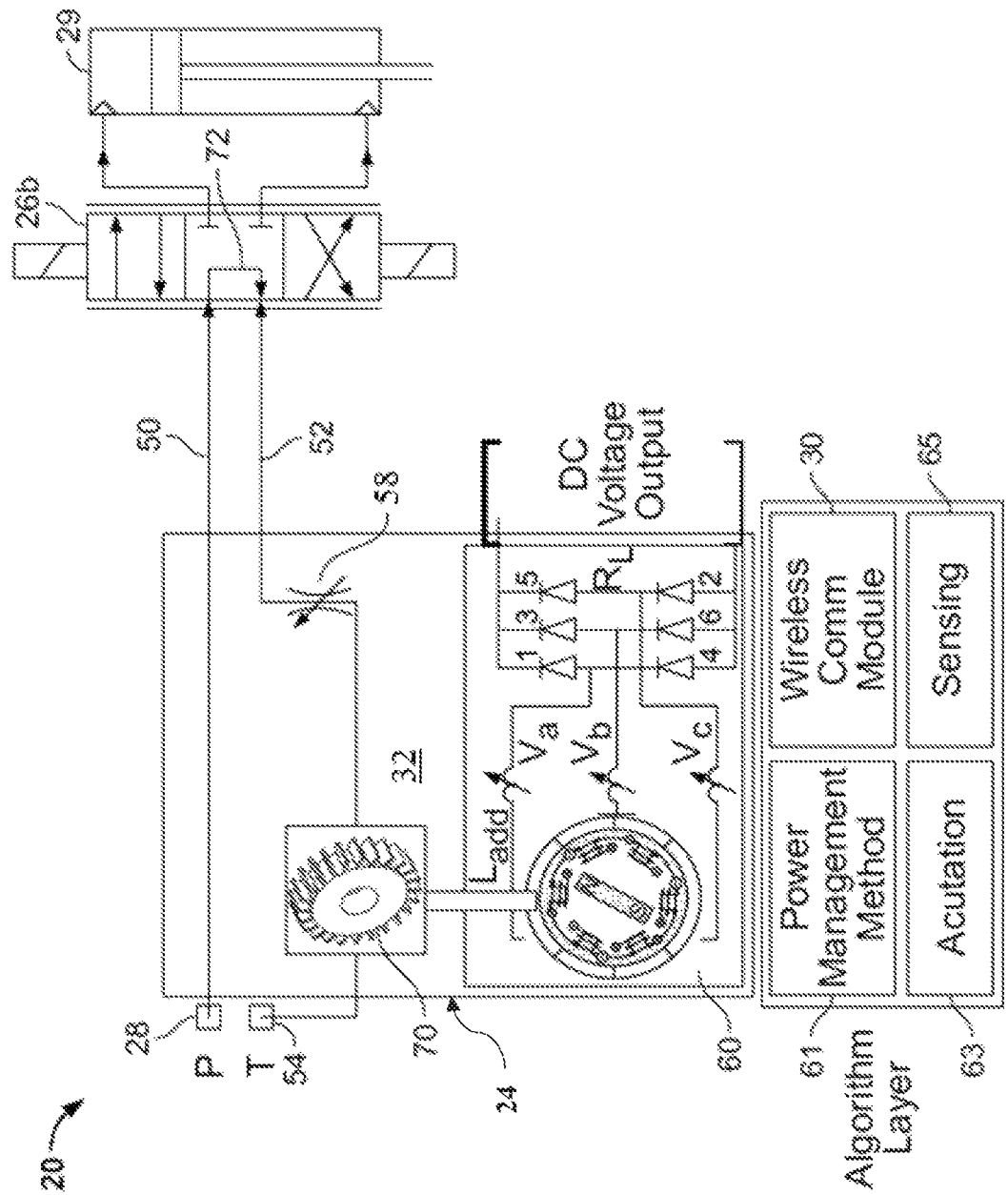
FIG. 10 shows another example of a self-powered wireless hydraulic system in accordance with the principles of the present disclosure that uses a turbine to harvest hydraulic energy for conversion into electrical power for powering various electronic components.

FIG. 10 shows another version of the self-powered wireless hydraulic system 20 in which the motor 56 has been replaced with a turbine 70 positioned along the low pressure line 52. The reducing valve 58 is also positioned along the low pressure line 52. The turbine 70 is configured to drive the generator 60. The output from the generator 60 can be used in the same way as described below with respect to the example of FIG. 9. The example of FIG. 10 includes a valve 26b that has been modified, as compared to the valve 26a of FIG. 9, to include an open center feature 72. The hydraulic turbine 70 connects downstream of the valve 26b, and the open center feature 72 allows for flow through the valve 26b to the turbine 70 even if the valve 26b is in a neutral position. The valve 26b can be solenoid controlled and the solenoid can be powered by the electrical power generated by the generator 60. Hydraulic fluid flow through the hydraulic turbine 70 generates a mechanical rotation. The shaft of the hydraulic turbine 70 spins the generator 60 with the assistance of a rectifier, and dc voltage is outputted from the generator 60. The voltage can be further regulated to meet the constant voltage required for various electronic power inputs. As with the example of FIG. 9, the electrical power from the generator 60 can be used to power various sensors, actuators, and communication and control devices in the wireless hydraulic system 20 as well as the self-powering module 24. For example, the dc voltage output from the generator 60 can be directed to the power management module 61 that selectively directs electrical power as needed to the wireless transceiver 30, to actuators 63 such as the solenoid of the valve 26b for actuation of the valve 26b, or to sensors 65 for sensing various parameters of the wireless hydraulic system 20.

In the example of FIG. 10, the turbine 70 is used to convert hydraulic energy into electrical energy for powering the wireless hydraulic system 20 including the electrohydraulic component 26, the wireless transceiver 30, and the self-powering module 24. In this way, the turbine 70 eliminates the need for supplemental power to be wired to the wireless hydraulic system 20. For turbines, high flow and low pressure drop is needed to generate efficient mechanical power. For this reason, the turbine 70 can be placed along the low pressure line 52 routed from the downstream side of the valve 26b to the tank 54. Like in the example of FIG. 9, disturbances related to electrical loading can be handled voltage regulation, and disturbances related to hydraulic fluctuation can be handled by the reducing valve 58.

The electrical load required by an electrohydraulic component in a hydraulic system, such as the electrohydraulic component 26 in the self-powered wireless hydraulic system 20, can vary significantly from standby current to full actuation current. Such variations in electrical load can cause challenges with respect to providing stable power supply from the harvesting device 32. In certain examples, various components are up-sized to ensure that sufficient voltages are provided to meet the highest load scenario. In such a case, the generator and motor may run at high speed to produce higher voltage than would typically be necessary. A voltage regulator can be used to provide the required value (e.g., bring the voltage from 48 volts to 24 volts). When the electrical load of the system increases, the generator speed is lowered. This reduction in generator speed results in a voltage drop. However, since the system has been up-sized, the dropped voltage is still higher than the minimum voltage requirement. For many applications, such an over design may be acceptable to provide adequate power. However, such systems do not operate at maximum efficiency and may result in wasted energy. If the various components are not up-sized, during high load situations, the voltage may drop below the minimum requirement. In this case, the active electronics associated with the various electrohydraulic components may not operate properly.

Figure 11:
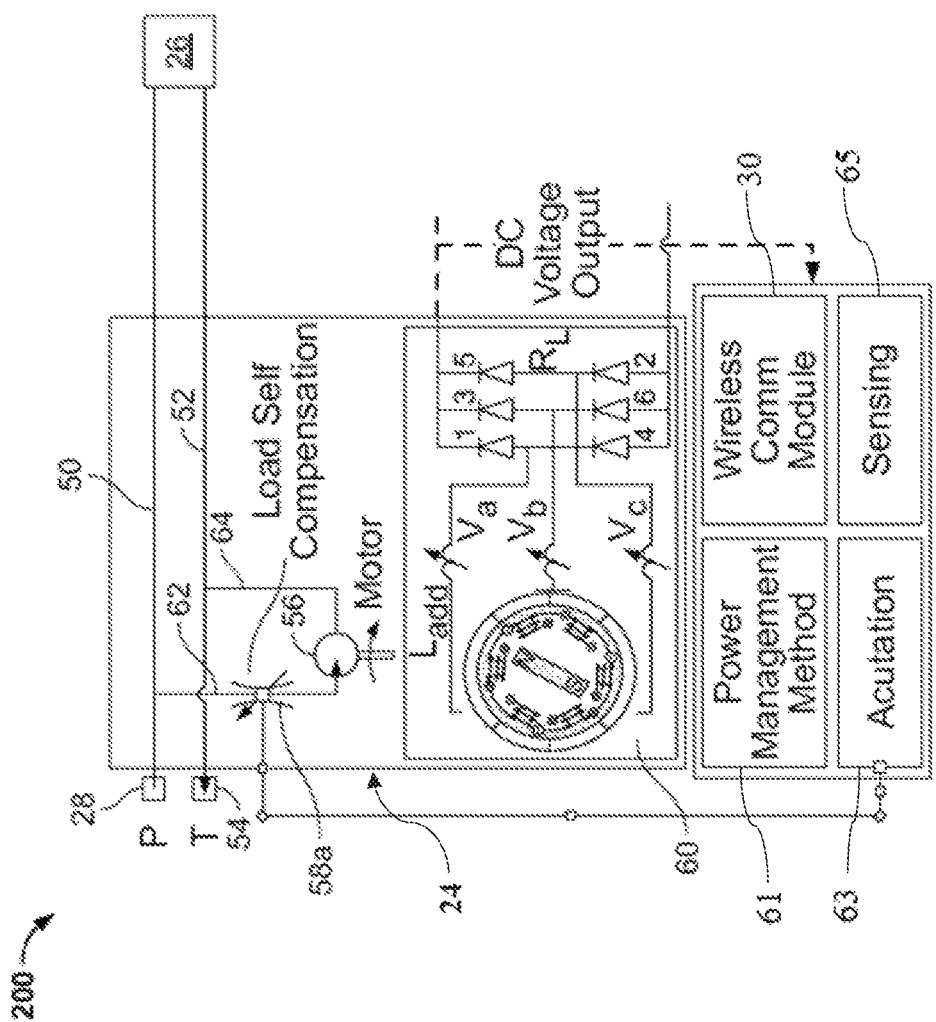
FIG. 11 illustrates another example of a self-powered wireless hydraulic system in accordance with the principles of the present disclosure that includes a self-compensation mechanism for controlling a voltage output generated by a harvesting device of the self-powered wireless hydraulic system.

FIG. 11 shows a third aspect of the present disclosure which relates to a self-powered wireless hydraulic system 200 that has been modified to include a self-compensation mechanism for maintaining a relatively constant voltage output regardless of variations in the electrical load required to support the system. The wireless hydraulic system 200 has many of the same components as the wireless hydraulic system 20 of FIG. 9. For example, the wireless hydraulic system 200 includes a high pressure line 50 connected to a pump 28 and a low pressure line 52 connected to a tank 54. The wireless hydraulic system 200 is connected to an electrohydraulic component 26 such as the solenoid driven 3-position proportional valve 26a of FIG. 9. It is noted that the wireless hydraulic system 200 can be fluidly connected to various other types of electrohydraulic components such as other types of motors, actuators, and valves. The wireless hydraulic system 200 includes a line 62 that connects an upstream side of a motor 56 to the high pressure line 50 and a line 64 that connects a downstream side of the motor 56 to a low pressure line 52. A self-compensation valve 58a is positioned along the line 62. The motor 56 drives a generator 60 which can be of the type described above. Additionally, the output of the generator 60 can be used in the same way described above with respect to the earlier embodiments to power the electrohydraulic component 26, as well as the wireless transceiver 30, the self-powering module 24, various actuators 63 and sensors 65, and other components in need of electrical power in the system 200.

Additionally, power from the generator 60 can be used to control operation of the self-compensation valve 58a. For example, the self-compensation valve 58a can be a variable orifice valve that includes a solenoid that is actuated using power generated by the generator 60 to control the size of a variable orifice. Under high electric load conditions, the orifice size of the self-compensation valve 58a can be enlarged so that more flow passes through the motor 56 and hence, more torque is generated by the motor 56 for powering the generator 60 in order to meet higher voltage demands. Under low electric load conditions, the orifice size of the self-compensation valve 58a can be reduced to provide less torque sufficient to support reduced voltage demands.

In certain examples, the speed of the generator 60 can be measured directly using a sensor 82. In other examples, the speed of the generator 60 is measured indirectly using a sensing algorithm that detects the speed of the generator 60 based on a parameter such as phase voltage signature. The system 200 can include a power management module 61 that determines an electrical power demand and computes the necessary speed of the generator 60 to match or satisfy the demand. The power management module 61 can interface with the self-compensation valve 58a to vary the size of the orifice of the self-compensation valve 58a in response to variations in electrical power demand. It will be appreciated that a map or other control logic can be used to correlate the voltage output of the generator 60 with respect to the speed of the generator 60. A power management circuitry or a controller (e.g., an amplifier) can drive or otherwise control the position of the solenoid of the self-compensation valve 58a such that when the electrical power demand is high, the orifice of the self-compensation valve 58a can be opened wider with less pressure drop. This causes an increased pressure drop in the hydraulic motor 56 which results in the motor 56 generating more torque. When the electrical load is low, the orifice of the self-compensation valve 58a can be closed to a smaller size with a corresponding higher pressure drop. This reduces the pressure drop that occurs across the motor 56. Thus, the motor 56 generates less torque. However, since the electrical load is lower, the lower torque results in the generator 60 being operated at a maintained constant speed.

Figure 12A:
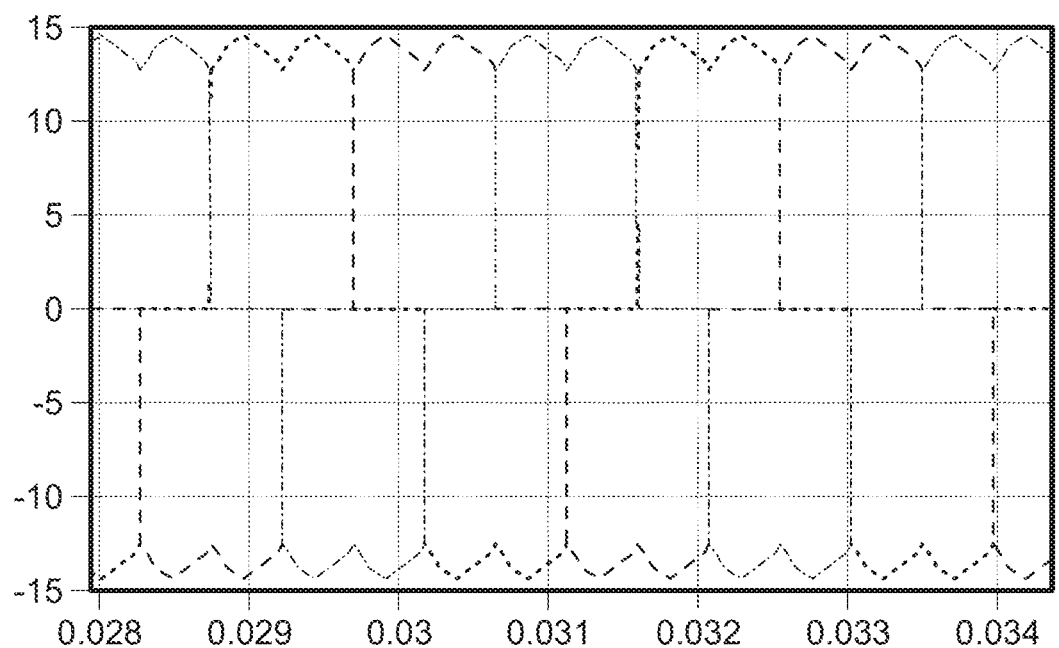
FIGS. 12A and 12B show example phase voltage curves corresponding to an example brushless DC generator that can be used in an energy harvesting device in accordance with the principles of the present disclosure.
Figure 12B:
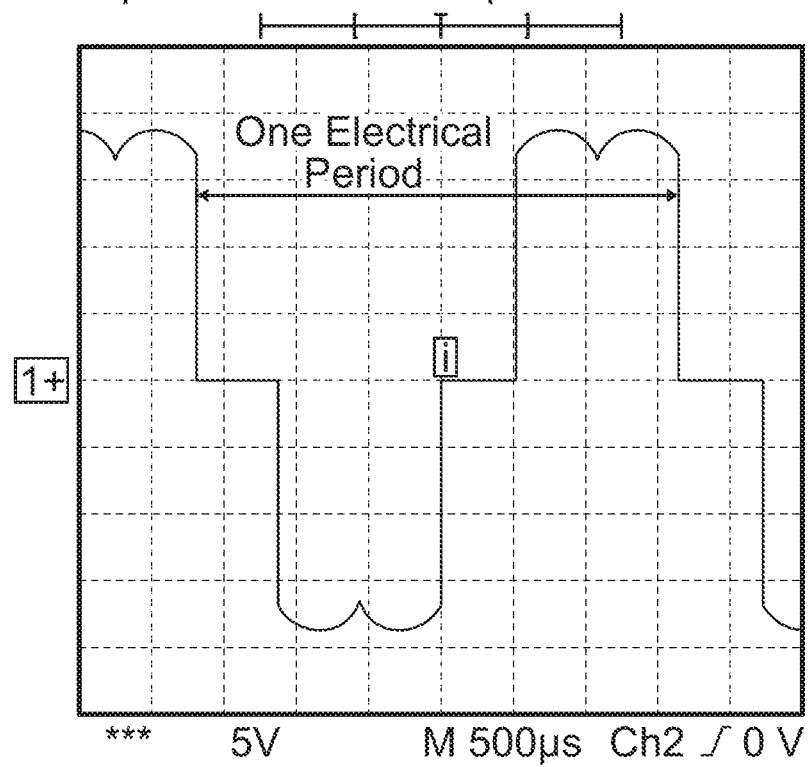

It will be appreciated that the speed of the generator 60 can be measured using the standard speed sensor 82. In other examples, the speed sensor 82 can be eliminated by self-sensing the speed of the generator 60. Generators such as brushless 3-phase DC generators have a signature phase voltage curve based on the brushless DC generator wiring. As shown in FIGS. 12A and 12B, this signature curve can be generated based on simulation or measurement. A crossing zero method can be used to detect the edge of the phase voltage curve and thus determine the electrical rotation period or frequency F. Given the poles (P) of the brushless DC generator, the synchronous speed can be calculated as being 120 multiplied by frequency divided by the poles. Accordingly, based on the speed of the generator 60, the flow rate through the hydraulic motor 56 can also be estimated since the hydraulic motor 56 has a known displacement for each rotation of the hydraulic motor 56.

Figure 13:
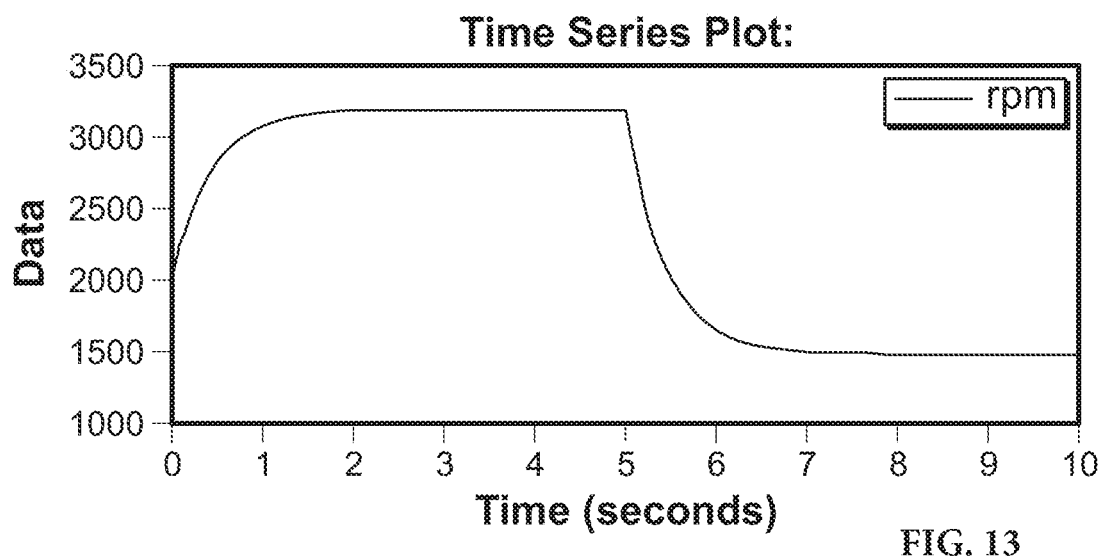
FIG. 13 is a graph showing motor or generator speed versus time for a system that does not include self-compensation.
Figure 14:
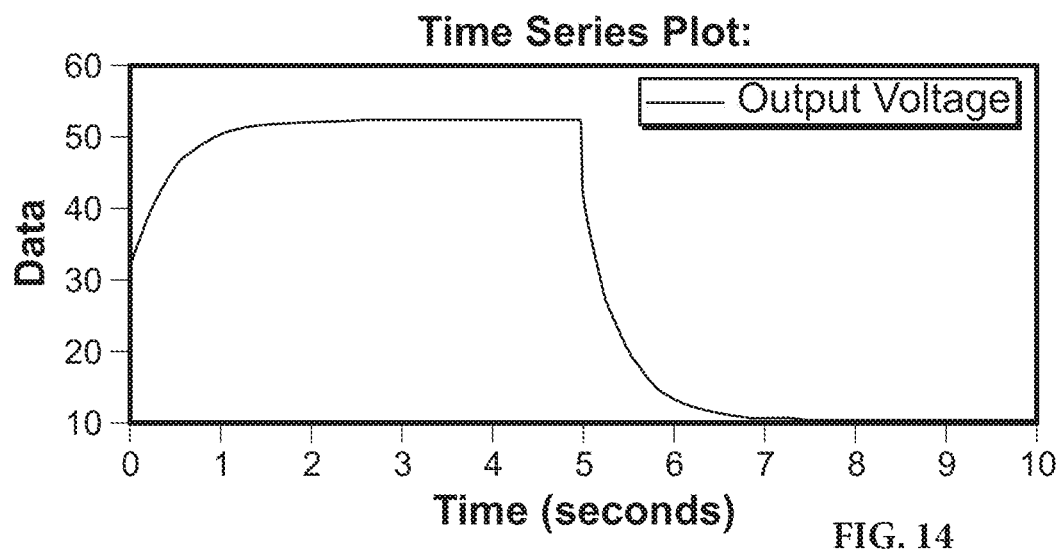
FIG. 14 is a graph showing output voltage versus time for a system that does not include self-compensation.
Figure 15:
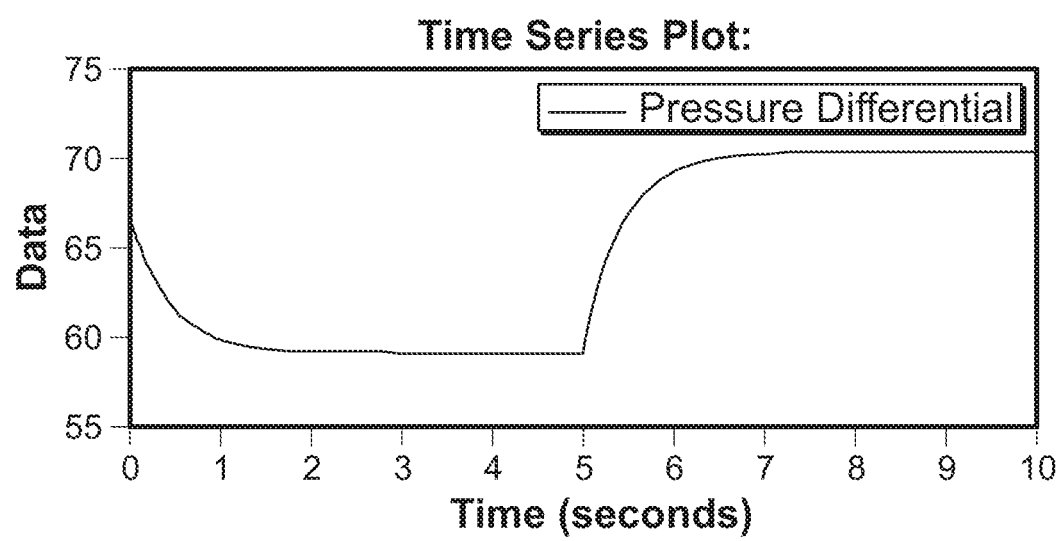
FIG. 15 is a graph showing pressure differential versus time for a system that does not include self-compensation.

FIGS. 13-15 show the effect of an increase in electrical load from 0.5 amps to 1.25 amps that occurs at the five second point in a system that does not have self-compensation. FIG. 13 shows rotation speed of the hydraulic motor or generator in relation to time. FIG. 14 shows output voltage of the generator in relation to time. FIG. 15 shows pressure differential across the motor in relation to time. As shown at FIG. 13, the motor speed drops from 3000 rpm to 1500 rpm due to the increase in electrical load. When the motor speed drops, the output voltage drops from 50 volts to 10 volts as shown at FIG. 14. Due to the speed slowdown, there is actually more pressure drop across the hydraulic motor. However, the increased hydraulic torque is not high enough to compensate for the electrical load change. In order to improve operation of this type of system, the system likely should be overdesigned to make sure that sufficient voltage is provided at the worst case scenario.

Figure 16:
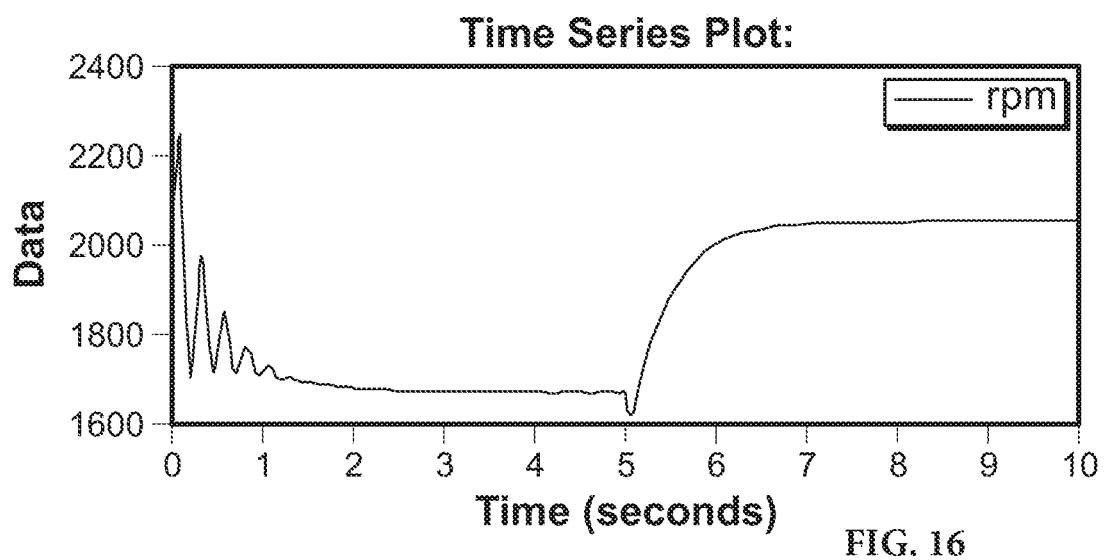
FIG. 16 is a graph that shows motor/generator speed versus time for a system that includes self-compensation.
Figure 17:
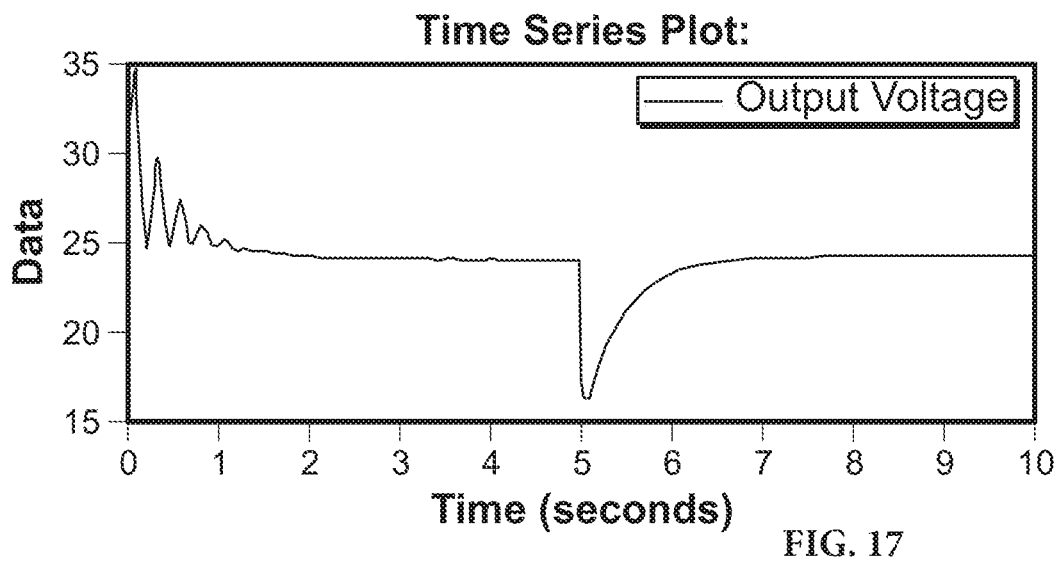
FIG. 17 is a graph that shows output voltage versus time for a system that includes self-compensation.
Figure 18:
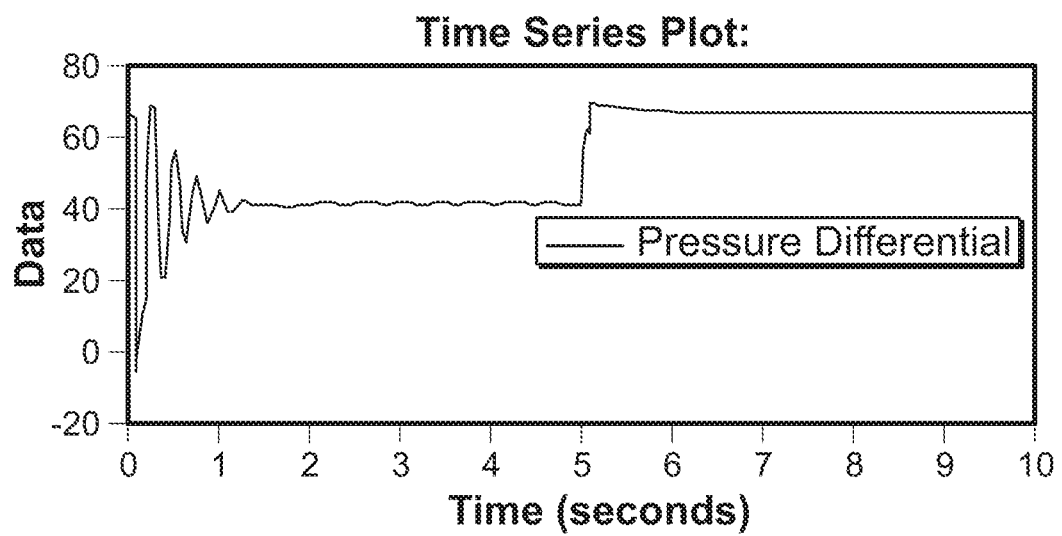
FIG. 18 is a graph that shows pressure differential versus time for a system that includes self-compensation.

FIGS. 16-18 show a system that includes the self-compensation valve 58a of FIG. 11 for maintaining a relatively constant voltage output despite changes in electrical load demand. FIG. 16 shows the rotation speed of the hydraulic motor or generator in relation to time. FIG. 17 shows the voltage output of the generator in relation to time. FIG. 18 shows the pressure differential across the motor in relation to time. Similar to the example of FIGS. 13-15, the electrical load on the system has been increased at the five second mark. However, the speed of the hydraulic motor and thus the generator was controlled to a higher speed in response to the increase in electrical load encountered at the five second point. By raising the speed of the hydraulic motor in response to the increase in electrical load, the output voltage is generally maintained at a constant level despite the change in electrical load (see FIG. 17). Thus, the compensation at the variable self-compensation valve 58a ensures that the pressure differential across the hydraulic motor is high enough to overcome an increase in electrical load.

Figure 19:
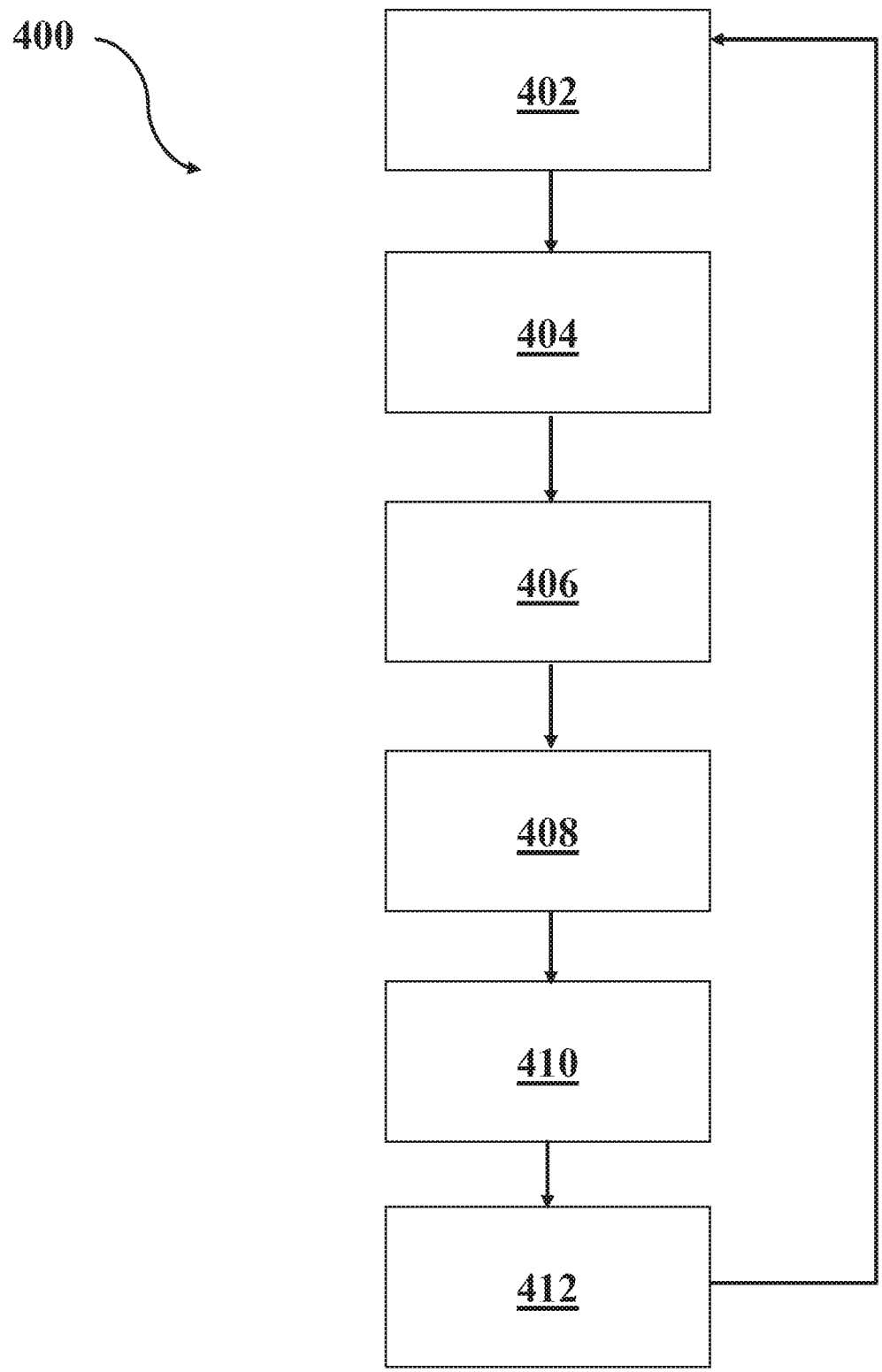
FIG. 19 is a flow chart illustrating a method for self-compensating a self-powered wireless hydraulic system.

FIG. 19 illustrates a method 400 for self-compensating a self-powered wireless hydraulic system. The method 400 includes an initial step 402 of measuring an output voltage. Next, the method 400 includes a step 404 of setting a desired output voltage. A step 406 includes calculating the difference between the desired voltage and the actual voltage applying the difference to a control algorithm (e.g., PID control) for generating a speed set point for the generator and the hydraulic motor. In one example, the speed set point can be added (e.g., like a baseline speed rpm). A next step 408 includes measuring the speed of the generator directly using an external sensor or measuring the speed of the generator indirectly using a sensing algorithm. A further step 410 includes applying the speed set point and the actual speed value through a control algorithm to create a compensation valve command. Next, a step 412 includes varying the size of an orifice of a self-compensation valve so that the hydraulic flow through the motor generates a torque at the motor that is sufficient to drive the generator at the speed set point that corresponds to the desired voltage. The steps 402-412 may be repeated at will for varying the size of the orifice of the self-compensation valve.

Various modifications and alterations of this disclosure will become apparent to those skilled in the art without departing from the scope and spirit of this disclosure, and it should be understood that the scope of this disclosure is not to be unduly limited to the illustrated examples set forth herein.

What is claimed is:

1. A hydraulic system comprising:
 a harvesting device for converting hydraulic energy into electrical energy;
 an electrohydraulic component powered by the electrical energy from the harvesting device;
 a wireless transceiver connected to the electrohydraulic component and powered by the electrical energy from the harvesting device;
 a flow control device powered by the harvesting device for actively controlling a hydraulic flow through the harvesting device, wherein the flow control device includes a solenoid controlled variable sized orifice; and
 a controller that varies a size of the variable sized orifice based on an electrical load required by the harvesting device such that the harvesting device self-compensates to reduce voltage level fluctuations caused by variations in electrical loads.

2. The hydraulic system of claim 1, wherein the harvesting device includes a hydraulic motor that drives an electric generator.

3. The hydraulic system of claim 1, wherein the harvesting device includes a turbine that drives an electric generator.

4. The hydraulic system of claim 1, wherein the harvesting device includes an electric generator, wherein the electric generator is a 3-phase brush-less direct current generator.

5. The hydraulic system of claim 1, wherein the wireless transceiver is interfaced with electronic control circuitry of the electrohydraulic component;
wherein the wireless transceiver is configured to receive control commands for the electrohydraulic component; and
wherein the wireless transceiver is configured to transmit operational information corresponding to the electrohydraulic component.

6. The hydraulic system of claim 5, wherein the electrohydraulic component includes a valve, a motor, an actuator, or a pump.

7. The hydraulic system of claim 5, wherein:
the electrohydraulic component is a wired electrohydraulic component and the wireless transceiver is configured to convert and retrofit the wired electrohydraulic component into a wirelessly controlled electrohydraulic component.

8. The hydraulic system of claim 7, wherein the wireless transceiver includes a plug that interfaces with the wired electrohydraulic component.

9. The hydraulic system of claim 5, wherein the wireless transceiver is interfaced with the electrohydraulic component and a sensor.

10. The hydraulic system of claim 9, wherein a hydraulic component comprises the wireless transceiver interfaced with the electrohydraulic component and the sensor.

11. The hydraulic system of claim 5, further comprising:
a human machine interface including a second wireless transceiver;
wherein the second wireless transceiver is configured to wirelessly transmit the control commands from the human machine interface to the electrohydraulic component, and to wirelessly receive the operational information corresponding to the electrohydraulic component.

12. An electrohydraulic system comprising:
a harvesting device for converting hydraulic energy into electrical energy, wherein the harvesting device includes a hydraulic motor that drives an electric generator, and wherein the electric generator is a 3-phase brush-less direct current generator;
a flow control device powered by the harvesting device for actively controlling a hydraulic flow through the harvesting device, wherein the flow control device includes a solenoid controlled variable sized orifice;
an electrohydraulic component powered by the electrical energy from the harvesting device;
a wireless transceiver connected to the electrohydraulic component and powered by the electrical energy from the harvesting device; and
a controller that varies a size of the variable sized orifice based on an electrical load required by the harvesting device such that the harvesting device self-compensates to reduce voltage level fluctuations caused by variations in electrical loads.

* * * * *